Dec. 8, 1942.                H. ALLEN                2,304,491
                           RELIEF VALVE
                       Filed Nov. 18, 1940
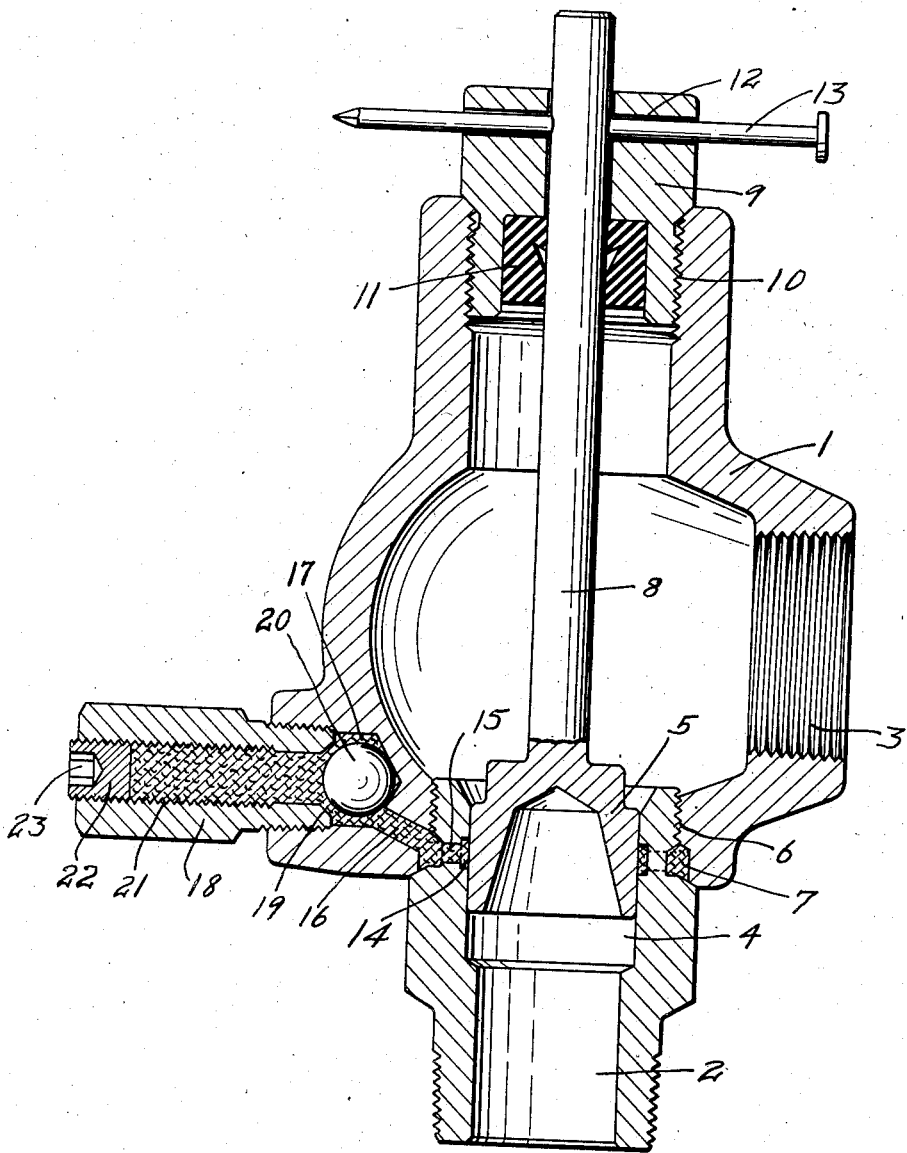
Herbert Allen
        INVENTOR.
BY
        ATTORNEYS.

Patented Dec. 8, 1942

2,304,491

UNITED STATES PATENT OFFICE 2,304,491

RELIEF VALVE

Herbert Allen, Houston, Tex., assignor to Abercrombie Pump Company, Houston, Tex., a corporation of Texas Application November 18, 1940, Serial No. 366,025

7 Claims. (Cl. 137—53)

This invention relates in general to a relief valve employed for relief of high pressures in the event the pressures become excessive, and more particularly has reference to the packing and seating of valves.

Where valves are packed in the usual manner with leather or asbestos packing secured to the valve element or to the valve seat, the packing tends to deteriorate with age. If, after the packing becomes aged and deteriorated, the valve is opened because of excessive pressure, it has been found that when it is closed again it will not form a proper seal because of the fact that the packing has deteriorated with age and in many cases has actually become torn in the opening of the valve. It then becomes necessary to shut down the boiler or other device on which the valve is located, remove the valve and either replace or repack it. This is, of course, expensive and involves loss of time and perhaps the laying up of high priced machinery. In the case of oil well drilling apparatus, it might even involve danger of a blow-out during the time power is not available for continuing the drilling and it might even involve the loss of the well itself. The importance of saving time will be appreciated from the fact that it costs sometimes as high as $200,000 and not infrequently $100,000 to drill a modern well and the rental of a modern rotary drilling rig is in the neighborhood of $300 per day.

It is the principal object of this invention to provide a relief valve with packing, which may be renewed without taking the valve out of service and without any substantial delay or loss of time.

Another object of this invention is to provide a valve having a packing receiving groove and means for forcing a plastic packing into said groove.

Still another object of this invention is to provide a packed joint having a packing receiving groove, a duct communicating with said groove, means for forcing plastic packing material through said duct into said groove, and valve means for retaining the packing, forced through said duct into said groove, under pressure.

In the single figure of the drawing, there is shown a vertical sectional view of a valve embodying the present invention.

In the drawing, the housing or casing 1 of the valve is provided with an inlet 2 and an outlet 3. The upper end of the inlet fitting is formed with a bore 4 in which the valve element 5 fits, but in which it is readily slidable. The fitting 2 is threaded into the housing or casing at 6 and is sealed thereto by means of a packing body 7, which will presently be described.

The valve element 5 has a stem 8, which projects through a bushing 9 threaded at 10 into the upper end of the valve housing 1. This bushing 9 has a counter-bore in its inner end for the reception of a pressure expansible packing 11, which forms a seal between the stem 8 and the bushing 9. The bushing 9 is also provided with a transverse opening 12 adapted to register with a similar opening through the upper end of the stem 8 and when these openings are in register, a pin 13, which may be an ordinary wire nail, may be inserted to act as a shear member in holding the valve closed.

It will be seen that excessive pressure in the inlet 2 will exert a force upon the valve element 5, tending to move it upwardly to open position. When this force becomes great enough, it will shear the element 13 and the valve will move quickly to open position.

For the purpose of forming the packing 7 between the inlet 2 and the housing 1 and for the purpose of forming a packing ring 14 between the inlet 2 and the valve element 5, the annular grooves or spaces in which these packings are adapted to be positioned are interconnected by means of spaced radial passages 15 and are connected by means of a passage or duct 16 to a valve chamber 17 formed in a portion of the housing. Threaded into this valve chamber 17 is a pressure fitting 18 having a valve seat 19 on its inner end adapted to form a seat for a ball valve 20 within the valve chamber 17. The fitting 18 is provided with a bore throughout its length and this bore is threaded at 21 to receive a plug 22 having a non-circular socket 23 in its outer end for the purpose of receiving a wrench.

When the valve element 5 is in closed position, as shown, plastic packing material, consisting of suitable fibrous and lubricating materials which are well known, is placed in the fitting 18 and is forced through the fitting 18 by means of the plug 22. As this plug is moved into the fitting 18, the valve 20 will be displaced from its seat by the plastic packing flowing through the passages 15 and 16 to fill the annular spaces and form the annular packing members 7 and 14. If, at any time during use, the valve shows signs of slight leakage, this may be corrected by applying additional pressure to the plastic packing in the fitting 18 through the tightening of the plug 22. The supply of plastic packing in the fitting 18 may also be renewed from time to time by simply removing the plug 22 and filling the fitting. Back flow of the packing cannot take place during this operation because it will be prevented by the valve 20 seating on the inner end of the fitting 18.

If the packing in the annular portion 14 becomes deteriorated with age or due to heat or other causes and thereafter the valve is caused to open, that portion of the packing will naturally become of no further use. It may, however, be forced out into the stream of escaping pressure fluid flowing through the valve and the valve element 5 may again be moved to closed position by simply pushing on the outer end of the stem 8. With a new pin 13 in place, the valve element 5 will be held in closed position. It may then again be packed by simply tightening up on the plug 22.

It will be realized that at no time in the procedure described is it necessary to remove the valve from service for the purpose of re-packing it and no expensive tools will be involved. However, the valve may at all times be provided with a perfect packing and there will be no danger of a disastrous leak occurring either after the valve has been re-set or at any other time during its use. Thus, the present invention overcomes defects long existing in the prior art.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:

1. A relief valve comprising a casing having inlet and outlet ports, a tubular fitting mounted in the inlet port, the outer portion of said fitting which is received in the inlet port having an annular groove surrounding said fitting, the wall of said inlet port having an opening therein registering with the groove in said fitting, a duct in said casing communicating at one end with said opening for introducing plastic packing material into said groove, the interior of said fitting being bored to receive a sliding valve body, the wall of said bore having an annular packing groove formed therein, and passages placing the grooves on the inside and outside of said fitting in communication, whereby plastic packing material introduced into said outer groove will flow into said inner groove.

2. A relief valve comprising a casing having inlet and outlet ports, a tubular fitting mounted in the inlet port, the outer portion of said fitting which is received in the inlet port having an annular groove surrounding said fitting, the wall of said inlet port having an opening therein registering with the groove in said fitting, a duct in said casing communicating at one end with said opening for introducing plastic packing material into said groove, a check valve in said duct for retaining packing in said groove which has been forced therein through said duct, the interior of said fitting being bored to receive a sliding valve body, the wall of said bore having an annular packing groove formed therein, and passages placing the grooves on the inside and outside of said fitting in communication, whereby plastic packing material introduced into said outer groove will flow into said inner groove.

3. A relief valve comprising a casing having inlet and outlet ports, a tubular fitting mounted in the inlet port, the outer portion of said fitting which is received in the inlet port having an annular groove surrounding said fitting, the wall of said inlet port having an opening therein registering with the groove in said fitting, a duct in said casing communicating at one end with said opening for introducing plastic packing material into said groove, a check valve in said duct for retaining packing in said groove which has been forced therein through said duct, means communicating with the duct for forcing plastic packing material therethrough into said groove, the interior of said fitting being bored to receive a sliding valve body, the wall of said bore having an annular packing groove formed therein, and passages placing the grooves on the inside and outside of said fitting in communication, whereby plastic packing material introduced into said outer groove will flow into said inner groove.

4. A relief valve comprising a casing having inlet and outlet ports, a tubular fitting mounted in the inlet port, the outer portion of said fitting which is received in the inlet port having an annular groove surrounding said fitting, the wall of said inlet port having an opening therein registering with the groove in said fitting, a duct in said casing communicating at one end with said opening for introducing plastic packing material into said groove, the other end of said duct terminating in an enlarged bore, an internally threaded tube secured in said enlarged bore, a threaded plug in said tube operable upon rotation for forcing plastic packing material from the tube through the duct into said groove, the interior of said fitting being bored to receive a sliding valve body, the wall of said bore having an annular packing groove formed therein, and passages placing the grooves on the inside and outside of said fitting in communication, whereby plastic packing material introduced into said outer groove will flow into said inner groove.

5. A relief valve comprising a casing having inlet and outlet ports, a tubular fitting mounted in the inlet port, the outer portion of said fitting which is received in the inlet port having an annular groove surrounding said fitting, the wall of said inlet port having an opening therein registering with the groove in said fitting, a duct in said casing communicating at one end with said opening for introducing plastic packing material into said groove, the other end of said duct terminating in an enlarged bore, an internally threaded tube secured in said enlarged bore, a threaded plug in said tube operable upon rotation for forcing plastic packing material from the tube through the duct into said groove, the interior of said fitting being bored to receive a sliding valve body, the wall of said bore having an annular packing groove formed therein, passages placing the grooves on the inside and outside of said fitting in communication, whereby plastic packing material introduced into said outer groove will flow into said inner groove, and a ball seated in said enlarged bore and adapted to seat in the end of said tube to retain material forced out of said tube from reentering the latter.

6. A relief valve comprising a casing having inlet and outlet ports, a tubular fitting mounted in the inlet port, the outer portion of said fitting and the inner surface of the inlet port which cooperates therewith having an annular groove formed therebetween and surrounding said fitting, the wall of said inlet port having an opening therein registering with said groove, a duct in said casing communicating at one end with said opening for introducing plastic packing material into said groove, the interior of said fitting being bored to receive a sliding valve body, a sliding valve body therein, the coacting surfaces of the wall of said bore and the sliding valve body having an annular packing groove formed therebetween, and passages placing the grooves on the inside and outside of said fitting in communication, whereby plastic packing material introduced into said outer groove will flow into said inner groove.

7. A relief valve comprising a casing having inlet and outlet ports, a tubular fitting mounted in the inlet port, the outer portion of said fitting and the inner surface of the inlet port which cooperates therewith having an annular groove formed therebetween and surrounding said fitting, the wall of said inlet port having an opening therein registering with said groove, a duct in said casing communicating at one end with said opening for introducing plastic packing material into said groove, the interior of said fitting being bored to receive a sliding valve body, a sliding valve body therein, the contacting surfaces of the wall of said bore and the sliding valve body having an annular packing groove formed therebetween, and means for introducing plastic packing material into said annular groove between said fitting and said valve body.

HERBERT ALLEN.